Figure 3:
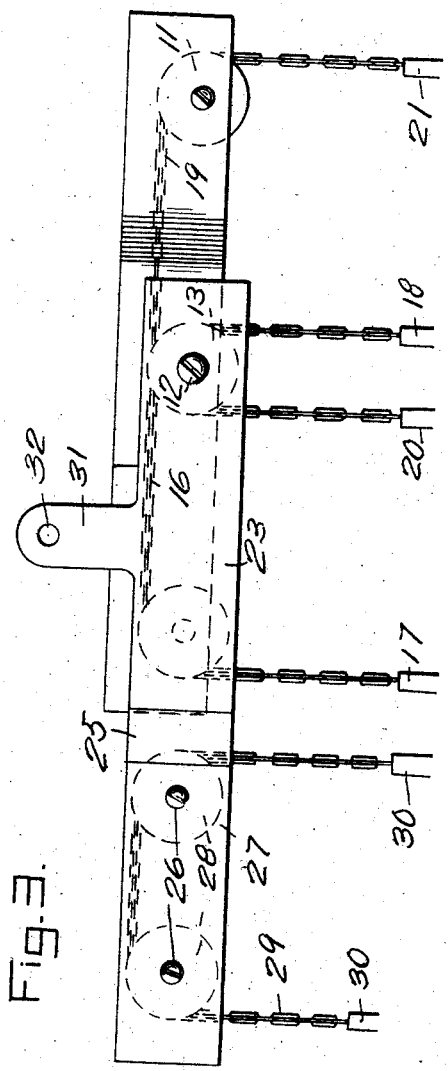

No. 883,599. PATENTED MAR. 31, 1908.
W. M. WEDEKING & H. JACOBI.
DRAFT EQUALIZER.
APPLICATION FILED MAR. 4, 1907.
2 SHEETS—SHEET 1.
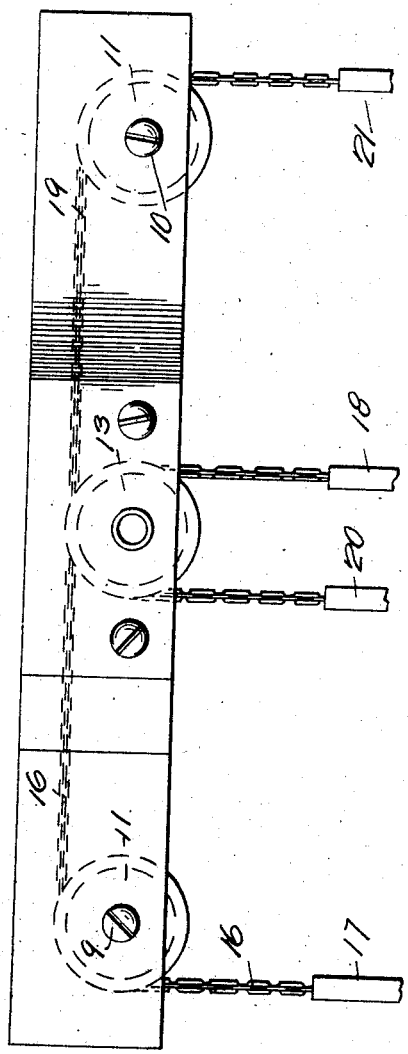
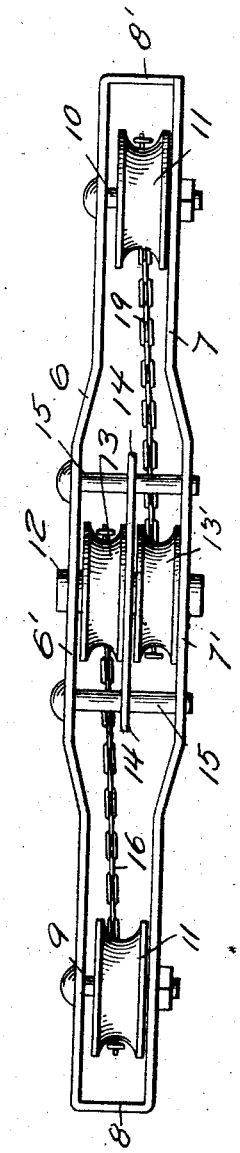
Witnesses
G. R. Thomas
M. T. Miller
Inventors
W. M. Wedeking
H. Jacobi
By
Attorneys No. 883,599. PATENTED MAR. 31, 1908.
W. M. WEDEKING & H. JACOBI.
DRAFT EQUALIZER.
APPLICATION FILED MAR. 4, 1907.

2 SHEETS—SHEET 2.

Witnesses
G. R. Thomas
M. F. Miller

Inventors
W. M. Wedeking
H. Jacobi
By Chandlee Chandlee
Attorneys

UNITED STATES PATENT OFFICE.

WILLIAM M. WEDEKING AND HENRY JACOBI, OF ABBOTSFORD, WISCONSIN.

DRAFT-EQUALIZER.

No. 883,599.     Specification of Letters Patent.    Patented March 31, 1908.

Application filed March 4, 1907. Serial No. 360,377.

*To all whom it may concern:*

Be it known that we, WILLIAM M. WEDEKING and HENRY JACOBI, citizens of the United States, residing at Abbotsford, in the county of Clark, State of Wisconsin, have invented certain new and useful Improvements in Draft-Equalizers; and we do hereby declare the following to be a full, clear, and exact description of the invention, such as will enable others skilled in the art to which it appertains to make and use the same.

The present invention relates to draft equalizers, and it aims to provide an improved device of that nature.

With the above and other ends in view, the invention consists in the construction, combination, and arrangement of parts, all as hereinafter more fully described, specifically claimed, and illustrated in the accompanying drawings, in which like parts are designated by corresponding reference numerals in the several views.

Figure 4:
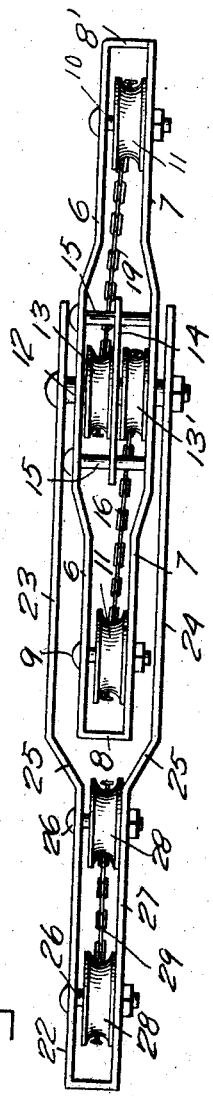

Of the said drawings:—Figure 1 is a top plan view of the device in use as equalizer for the draft of two horses. Fig. 2 is a face view, showing the position of the several pulleys. Fig. 3 is a view similar to Fig. 1, showing a modified form adapted for use in connection with three horses. Fig. 4 is a face view of Fig. 3.

Referring to the drawings, and more particularly to Figs. 1 and 2, the device, which is shown therein as an equalizer for the draft of two horses, is formed of a single strip of steel, or other suitable metal, bent upon itself to form the upper and lower members 6 and 7 disposed horizontally and connected by the short vertical section 8, the free end of the upper member being bent downwardly to provide a vertical member 8', which closes the casing formed by the members 6 and 7 at such side, the sections 8 and 8' being of approximately the same length. The upper and lower members 6 and 7 are bowed outwardly intermediate their ends, as indicated by the reference numerals 6' and 7'.

The opposite ends of the members 6 and 7 are provided with alining perforations, through which the tie-bolts 9 and 10 are passed, each tie-bolt being provided with a pulley 11, loosely mounted thereon. The bowed portions 6' and 7' of said members are in like manner provided with registering perforations, in which a sleeve 12 is engaged. The sleeve 12 carries a pair of pulleys 13 and 13' rotatably mounted thereon. The pulleys 13 and 13' are maintained in spaced relation to each other by means of a metal plate 14, disposed between the members 6 and 7 and secured thereto at opposite ends by bolts 15, such plate being likewise provided with an opening formed in alinement with the sleeve openings in the members 6 and 7, and through which the sleeve 12 passes.

The pulley 11 on the bolt 9 is connected with the pulley 13 by a draft chain 16, one end of which is connected to the outer trace 17 of one horse, while the other end of said chain is connected to the inner trace 18 of the other horse. The pulley 11 on the bolt 10 is, in like manner, connected with the pulley 13' by a draft chain 19, one end of which is secured to the inner trace 20 of the first horse, while the opposite end is secured to the outside trace 21 of the second horse. It will therefore be apparent that if either horse slackens his traces, the traces of the other horse will be lengthened to the same extent, thus maintaining an equalized draft at all times.

In the modified construction shown in Figs. 3 and 4, the two-horse evener is carried by a yoke 22 which is likewise formed of a single strip of metal, and comprises the upper and lower members 23 and 24, respectively, which, intermediate their ends, are bent divergently from each other, as as 25, to form a seat in which the two-horse evener is disposed, the free ends of the members 23 and 24 extending parallel with and in spaced relation to the bowed portions 6' and 7' of the members 6 and 7. The yoke members 23 and 24 are connected by the tie-bolts 26, which are arranged at the constricted or neck portion 27 of the yoke, and said members are further connected at their opposite ends by the sleeve 12 of the two-horse evener, the opposite ends of said sleeve passing through alining perforations with which said members are provided. To prevent displacement of the sleeve, one of its projecting ends is headed, as shown, while its other end carries a nut. Each tie-bolt 26 carries a pulley 28, the said pulleys being connected by a draft chain 29 whose opposite ends are connected to the traces 30 of the third horse. It will be apparent that the two-horse evener is capable of a swinging movement upon the sleeve 12 within the yoke 22, thus effecting an equalized draft. The yoke is attached to the pole (not shown) of a vehicle or directly to its axle, by means of a pair of rearwardly-extending tongues 31 which are integral with the members 23 and 24, and are provided with alining perforations 32 through which the fastening bolts are passed. The several pulleys are grooved, as shown, to retain the chains in place thereon, and the several chains are prevented from interfering with each other by means of the plate 14, which is provided for that purpose.

What is claimed is:—

1. A draft equalizer comprising a casing formed of a single strip of metal bent upon itself to provide an upper and a lower member arranged in spaced relation to each other; means connecting the corresponding ends of said members; a pulley carried by each of said connecting means; means connecting said members with each other intermediate their ends; pulleys carried by said last-mentioned connecting means; draft chains connecting the several pulleys; and a trace secured to each end of each draft chain.

2. A draft equalizer comprising a casing formed of a single strip of metal bent upon itself to provide an upper and a lower member arranged in spaced relation to each other; bolts connecting the corresponding ends of said members; a pulley carried by each of said bolts; a sleeve connecting said members intermediate their ends; a pair of pulleys mounted on said sleeve in spaced relation to each other; a draft chain connecting each of said first-mentioned pulleys with one of the pulleys on said sleeve; and a trace secured to each end of each draft chain.

3. A draft equalizer comprising in combination a yoke; means connecting the members of said yoke at one end; pulleys carried by said connecting means; a draft chain connecting said pulleys; a casing pivotally mounted between said yoke members at the opposite end thereof, said casing comprising a pair of members arranged in spaced relation to each other; means connecting the members of said casing; pulleys carried by said last-mentioned connecting means; draft chains connecting the several pulleys; and a trace secured to each end of each draft chain.

4. A draft equalizer comprising a yoke including a constricted neck portion; a pair of tie-bolts connecting the yoke members at said constricted portion; a pulley carried by each of said bolts; a draft chain connecting said pulleys; a casing pivotally mounted between the yoke members adjacent the free end thereof, said casing comprising a pair of members arranged in spaced relation to each other; means connecting the members of said casing; pulleys carried by said last-mentioned connecting means; draft chains connecting the several pulleys; and a trace secured to each end of each draft chain.

5. A draft equalizer comprising a yoke formed of a single strip of metal bent upon itself to provide an upper and a lower member arranged in spaced relation to each other, each of said members having a rearwardly extending tongue; means connecting the members of said yoke at one end; pulleys carried by said connecting means; a draft chain connecting said pulleys; a casing pivotally mounted between said yoke members at the opposite end thereof, said casing comprising a pair of members arranged in spaced relation to each other; means connecting the members of said casing; pulleys carried by said last-mentioned connecting means; draft chains connecting the several pulleys; and a trace secured to each end of each draft chain.

6. A draft equalizer comprising a yoke formed of a single strip of metal bent upon itself to provide an upper and a lower member arranged in spaced relation to each other, said yoke including a constricted neck portion; a pair of tie-bolts connecting the yoke members at said constricted portion; a pulley carried by each tie-bolt; a draft chain connecting said pulleys; a casing pivotally mounted between said yoke members adjacent the free end thereof, said casing comprising a single strip of metal bent upon itself to provide an upper and a lower member arranged in spaced relation to each other; a pair of pulleys carried by the pivot upon which said casing is mounted; means connecting the corresponding ends of said casing members; pulleys carried by said last-mentioned connecting means; draft chains connecting the several pulleys of said casing; and a trace secured to each end of each draft chain.

In testimony whereof, we affix our signatures, in presence of two witnesses.

WILLIAM M. WEDEKING.
HENRY JACOBI.

Witnesses:
A. H. FLAIG,
A. J. MEYERS.